April 29, 1958  H. R. NOYES  2,832,091
SPRING ATTACHMENT FOR CASTERS
Filed June 1, 1954

HAZLEHURST ROSS NOYES,
INVENTOR.

HUEBNER, BEEHLER,
WORREL & HERZIG,
ATTORNEYS.

United States Patent Office 2,832,091
Patented Apr. 29, 1958

2,832,091

SPRING ATTACHMENT FOR CASTERS

Hazlehurst Ross Noyes, Hollywood, Calif., assignor to Aerol Co., Inc., Los Angeles, Calif., a corporation of California Application June 1, 1954, Serial No. 433,596

6 Claims. (Cl. 16—44)

This invention relates to improvements in casters and more particularly to spring-type shock absorbing means especially adapted for use in casters.

It is a broad object of this invention to provide a caster having new and improved spring-type shock absorbing means for use on heavy duty equipment such as dollies, portable machines, and the like.

Floor surfaces in factories, garages and other installations where heavy duty machines are employed and on which such machines are moved about from place to place are usually rough and often have holes therein or relatively deep depressions which make it difficult to move the machines over such surfaces. It is an object of this invention to provide a caster for such machines which permits substantial vertical movement of the caster wheel so as to maintain the wheel in continuous contact with the floor surface even when traveling over relatively deep surface depressions.

Another object of this invention is to provide a shock-absorbing spiral spring device which, upon being expanded to a predetermined limit and flexed, is self-locking so as to prevent further expansion of the spring.

Another object of this invention is to provide a caster and an expandable spring device of the above mentioned character which are sturdy and simple in construction and designed for heavy duty service.

Further objects and advantages of the invention will appear during the course of the following part of this specification wherein the details of construction and manner of functioning of a preferred embodiment of the invention are described with reference to the accompanying drawing wherein.

Figure 1:
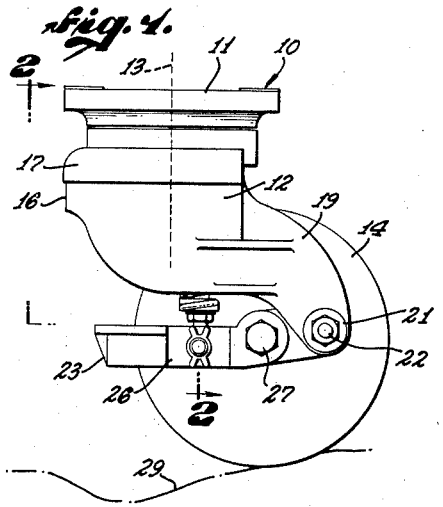
Figure 1 is a side elevation of a caster embodying this invention.
Figure 2:
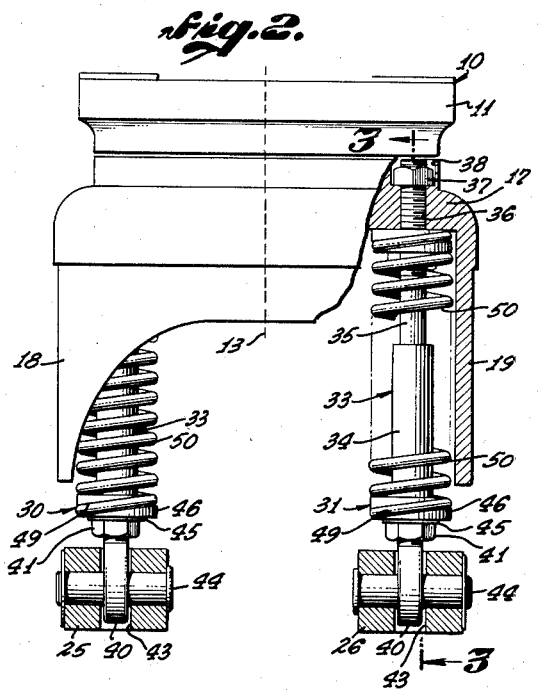
Figure 2 is an end elevation partly in vertical section of the swivel frame of the caster as viewed on line 2—2 of Figure 1.
Figure 3:
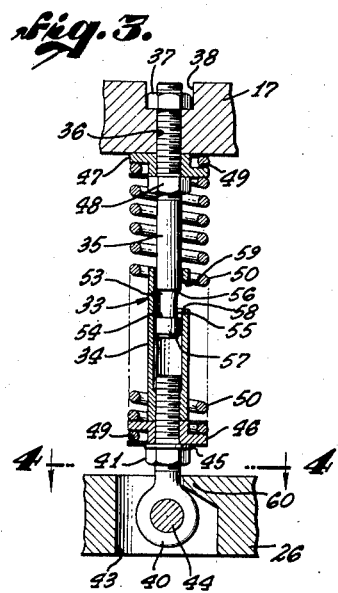
Figure 3 is a vertical longitudinal section of a shock absorbing spring device for the caster as taken on line 3—3 of Figure 2.

Referring to the drawings in greater detail, reference numeral 10 designates generally a caster embodying the present invention and including a turn table or base member 11 for mounting the caster on the underside of a dolly, portable machine, and the like. The caster includes a swivel frame or body portion 12 which is suitably mounted on the base member so as to be rotatable with respect thereto on a vertical axis indicated by dotted line 13. A caster wheel 14 is rotatably mounted in the body portion of the caster in a manner which will be presently described.

For convenience in describing the shape of the particular body portion 12 shown herein for illustrative purposes, it may be said to have a forward wall 16 which faces in the direction of travel of the caster. The forward wall 16 is integral with and dependent from a plate-like top 17 which provides a means for receiving a suitable swivel pin (not shown) having its axis common with the vertical axis 13 for rotatably mounting the body member on the caster base. Extending downwardly and rearwardly from the top plate and integral therewith and with the forward wall 16 so as to form side walls for the body member are two wheel supporting arms 18 and 19.

Each of the support arms 18 and 19 has a bushing formed therein, one of which is designated by reference numeral 21. These bushings are axially aligned with respect to each other and are spaced equi-distant from the vertical axis 13 and lie in a common plane perpendicular to the vertical axis. Each of the bushings receives a bolt, one of which is designated by numeral 22, and these bolts serve to pivotally mount a yoke 23 to the arms of the caster body. The yoke 23 is preferably of U-shape construction providing two spaced apart lever arms 25 and 26 integral at their forwardly disposed ends with a cross bar, forming the base of the U-shaped yoke, and which is substantially parallel to the axis of the wheel 14. Extending horizontally between the lever arms 25 and 26 of the yoke 23 and spaced forwardly from the bolts 22 and substantially parallel to the axis of the bolts, is an axle 27 for the wheel 14 rotatably supporting the wheel in the yoke.

As thus far described, it is seen that the floor contact point (designated at 29) on the circumference of the wheel is spaced from the vertical axis of the caster whereby the caster will be caused to travel in a direction of the force exerted to move the caster, as is usual in casters of this type.

To support the forwardly disposed portion of the yoke and to permit limited vertical movement of the caster wheel as it travels over a rough surface, the caster is provided with two shock absorbing spring devices designated generally by numerals 30 and 31. These are attached one to each of the lever arms 25 and 26 of the yoke, and as these spring devices are identical to each other, a description of the details of construction of one will apply equally well to the other.

Thus, the shock absorbing spring device 31 comprises a telescoping shaft 33 formed of a cylindrical sleeve 34 and an elongate rod 35 axially slidable in the sleeve. The upper end of the rod 35 extends through a hole 36 in the top plate 17 of the caster and is retained from sliding out from such hole by means of a nut 37 on the end of the rod and received in a countersink 38.

Figure 4:
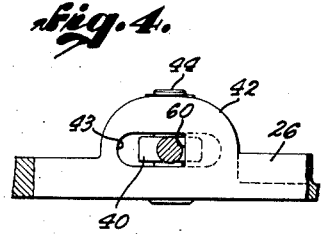
Figure 4 is a section on line 4—4 of Figure 3.

Secured in the lower end of the sleeve 34 as by a screw thread connection is an eyelet bolt 40 having a nut 41 threaded on its stem. Lever arm 26 of the wheel supporting yoke is thickened at a portion 42 thereof as best shown in Figure 4 to provide sufficient mass of the lever arm around a slot 43 formed in the lever arm for receiving the eyelet head portion of the bolt 40. A pivot pin 44 extends through the opening of the eyelet head of the bolt to pivotally support the bolt 40 to the lever arm 26.

Prior to fitting the sleeve 34 on the stem of the bolt 40 a lock washer 45 and a spring nut 46 are placed on the stem so that upon screwing the end of the sleeve 34 on the bolt the nut 41 will hold the spring nut 46 tightly against the end of the sleeve. The upper end of the rod 35 likewise receives a similarly formed spring nut 47 which is placed on the rod prior to inserting the end of the rod through the hole 36 in the top plate. Spring nut 47 is held in place on the rod 35 by means of a nut 48 threaded on the rod. Each of the spring nuts 46 and 47 have a spiral groove 49 in the outer surface thereof for receiving an end of a coil spring 50. The spring 50 is a heavy duty spring and as its ends are secured by the spring nuts 46 and 47 it will remain in place around the telescoping shaft 33 and thus serve to permit vertical movement of the caster wheel as the wheel travels over a rough surface.

It will be apparent from the above description that as the yoke 23 swings downwardly on its pivots 22, the place at which the shaft 33 is pivotally connected to the yoke will travel in an arcuate path rather than in a straight line. Thus, the shaft of the spring device will become slightly flexed in being expanded or shortened by the action of the wheel of the caster. The component parts of the shaft are therefore made to fit loosely with respect to each other so as to permit slight flexing of the shaft. Also, the hole 36 in the top plate 17 is likewise made large enough to provide a loose fit of the rod 35 in the hole.

The present invention provides a simple and reliable means for limiting the length to which the shaft 33 may be expanded so that the rod 35 will not become disengaged from the sleeve 34. For this purpose an annular channel 53 is formed around the inner end portion of the rod. Such channel defines a shoulder 54 proximate the end of the rod, a bottom wall 55 of the channel and an annular shoulder 56 which is tapered outwardly from the bottom wall of the channel. Thus a knob-like portion 57 is formed on the end of the rod.

Figure 5:
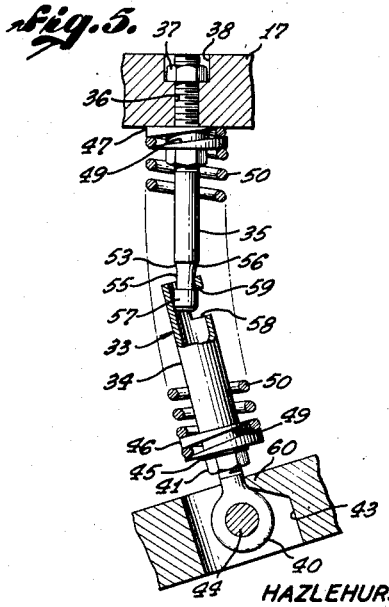
Figure 5 is a vertical longitudinal section showing the spring device in expanded and flexed condition.

Sleeve 34 has a notch 58 extending preferably approximately half way around the sleeve member and such notch forms a shoulder 59 which is spaced from the end of the sleeve by a distance less than that of the width of the annular channel 53 on the rod. Thus when the spring 50 and shaft 33 are expanded as a result of a downwardly swinging movement of the yoke supported caster wheel, the shoulder 54 on the rod and the shoulder 59 of the notch in the sleeve will become interengaged so as to prevent removal of the rod from within the sleeve. Stated otherwise, expansion and flexing of the shock absorbing device 31 causes its knob 57 to extend into the notch 58 so as to prevent further expansion of the shock absorbing device. Referring to Figure 5 of the drawing, it is apparent, too, that there is nothing in the spring device to prevent easy sliding of the rod 35 back into the sleeve 34 when pressure is exerted upwardly on the caster wheel.

Flexing of the shaft 33 and its spiral spring 50 sufficiently to cause tight engagement of the knob 57 in the notch 58 is insured by the provision of a stop element 60 which extends from the rearwardly disposed end wall of the lever arm slot 43 and engages the neck of bolt 40 on the shaft 33 when the shaft is expanded to its outermost limit. Thus the stop 60 causes the shaft to be flexed or kinked in a way to lock the knob 57 in the notch of the sleeve member and thereby provides a sturdy and reliable construction for insuring that the knob becomes locked in the sleeve notch when the spring device is expanded to a predetermined limit.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claim so as to embrace any and all equivalent structures and devices.

I claim:

1. A caster comprising a hollow body portion adapted to be mounted for rotation on a vertical axis and having a top plate portion and an open bottom, a yoke pivotally mounted in the body portion for swinging movement toward and away from said top plate, a caster wheel rotatably mounted in the yoke, and a shock absorbing device having one end thereof attached to said top plate and the other end attached to said yoke, said shock absorbing device comprising a shaft having telescoping parts attached respectively to the body portion and the yoke, a spiral spring around and coaxial with said shaft, the ends of said spring being fixed in place with respect to the ends of the shaft, a stop member associated with said yoke having a position of engagement with said shaft when the yoke is in a position swung away from said top plate whereby to kink said shaft when the shaft is expanded to a predetermined limit, and means on said parts engageable in kinked position of the shaft and adapted thereby to prevent expansion of the shaft beyond said limit.

2. A spring device comprising an elongate cylindrical sleeve member of circular cross section having an inner end and an outer end, an elongate rod member having an inner end and an outer end, the rod member being axially slidable in the sleeve member, the inner end portion of the rod member being inserted in the inner end portion of the sleeve member, said rod member having an annular channel around it and adjacent its inner end, said channel defining a first annular shoulder proximate the inner end of the rod member and a bottom wall and a second annular shoulder, said first shoulder lying in a plane perpendicular to the axis of the rod member, said second shoulder being tapered axially outwardly from said bottom wall to the outer surface thereof, said sleeve member having a notch cut through the wall thereof and providing a sleeve shoulder proximate the inner end of the sleeve member and lying substantially in a plane perpendicular to the axis of the sleeve member, said sleeve shoulder being spaced from the inner end of the sleeve member by a distance less than the width of said bottom wall, a spiral spring, said members being arranged coaxially in the spring, means on the outer end portion of the sleeve member in engagement with one end of the spring, and means on the outer end portion of the rod member in engagement with the other end of the spring.

3. A spring assembly comprising an elongate cylindrical sleeve member of circular cross section having an inner end and an outer end, an elongate rod member having an inner end and an outer end, the inner end portion of the rod member being inserted in the inner end portion of the sleeve member, the rod member being axially slidable in the sleeve member, a pair of spring nuts, one of said nuts being threadedly mounted on and adapted for a fixed engagement in a selected position with the outer end portion of the rod member, the other of said nuts being threadedly mounted on and adapted for fixed engagement in a selected position with the outer end portion of the sleeve member, each of said nuts having a spiral groove in its outer surface, a spiral spring around and coaxial with the sleeve and rod members, each end of the spring being fitted in respective grooves of said nuts.

4. A caster comprising a body element adapted to be mounted for rotation on a vertical axis, a lever element pivotally mounted on the body element whereby the free portion of the lever element is adapted to swing toward and away from the body element, a caster wheel rotatably mounted on the lever element, a telescoping shaft having one end pivotally attached to one said element and the other end pivotally attached to the other said element, said shaft comprising mutually extendible parts, a spiral spring around and coaxial with the shaft, the ends of the spring being fixed to the shaft whereby the spring is expanded when the shaft is expanded, a stop member operatively associated with said one element having a position of engagement with the shaft when the lever element is tilted relative to the body element whereby to kink said shaft when the shaft is expanded to a predetermined limit, and mutually engageable means on said extendible parts of said shaft having an automatically releasable engaged relation when the shaft is kinked and adapted thereby to prevent expansion of the shaft beyond said limit.

5. A shock absorbing spring device comprising an elongate cylindrical sleeve member having an inner end and an outer end, an elongate rod member having an inner end and an outer end, the inner end portion of the rod member being inserted in the inner end portion of the sleeve member, the rod member being axially slidable in the sleeve member, a pair of spring nuts, one of said nuts being in fixed engagement with the outer end portion of the rod member, the other of said nuts being in fixed engagement with the outer end portion of the sleeve member, each of said nuts having a spiral groove in its outer surface, a spiral spring around and coaxial with the sleeve and rod members, each end of the spring being fitted in respective grooves of said nuts to retain the spring on the device, said rod member having a knob on its inner end, said sleeve member having a notched portion in its inner end for engagement with the knob when said spring is flexed and expanded to a predetermined limit.

6. A spring assembly comprising an elongate cylindrical sleeve member having an inner end and an outer end, an elongate rod member having an inner end and an outer end, the inner end portion of the rod member being inserted in the inner end portion of the sleeve member and being axially slidable in the sleeve member, a pair of spring holding nuts, one of said nuts being threadedly mounted on and adapted for a fixed engagement in selected position with an outer end portion of one of said members, the other of said nuts being threadedly mounted on and adapted for engagement with the outer end portion of the other member, each of said nuts having a spiral groove in its outer surface, a spiral spring around and coaxial with the sleeve and rod members, each end of the spring being fitted in respective grooves of said nuts.

References Cited in the file of this patent

UNITED STATES PATENTS

| | | |
|---|---|---|
| 739,035 | Triner | Sept. 15, 1903 |
| 1,194,336 | Keim | Aug. 8, 1916 |
| 1,524,121 | Drzewienski | Jan. 27, 1925 |
| 1,634,932 | Cook | July 5, 1927 |
| 1,958,905 | Anderson | May 15, 1934 |
| 2,123,707 | Bloch | July 12, 1938 |
| 2,621,919 | Utz | Dec. 16, 1952 |